United States Patent [19]

Schulze

[11] 3,947,612

[45] Mar. 30, 1976

[54] METHOD OF FORMING ACTIVE SURFACES ON SOLIDS

[75] Inventor: Reinhold Schulze, Meckelfeld, Germany

[73] Assignee: Norddeutsche Affinerie, Hamburg, Germany

[22] Filed: Apr. 17, 1973

[21] Appl. No.: 352,082

[30] Foreign Application Priority Data

Apr. 19, 1972  Germany............................ 2218900

[52] U.S. Cl................................. 427/222; 252/428
[51] Int. Cl.² .............................................. B23B 7/04
[58] Field of Search . 117/98, 33, 138.8 A, 138.8 G, 117/138.8 UA, 161 UA, 161 UC, 161 P, 161 UB, 161 UH, 100 C, 100 B; 252/426, 427, 182, 184

[56] References Cited

UNITED STATES PATENTS

| | | | |
|---|---|---|---|
| 3,429,732 | 2/1969 | Baitinger............................ | 117/33.3 |
| 3,503,822 | 3/1970 | Turkewitsch........................ | 156/242 |
| 3,551,197 | 12/1970 | Lindquist........................... | 117/217 |
| 3,711,427 | 1/1973 | Murfree et al................... | 252/455 R |

*Primary Examiner*—P. E. Willis, Jr.
*Attorney, Agent, or Firm*—Karl F. Ross; Herbert Dubno

[57] ABSTRACT

A method of forming an active surface on a solid, e.g. for use of the solid as an adsorbent, catalyst carrier or contact or reactant catalyst, comprising adding a mixture of binders to a solution or suspension of an activatable substance (reactant), the binder mixture containing water-insoluble synthetic-resin substances which can be swelled by water only to a limited extent.

1 Claim, No Drawings

METHOD OF FORMING ACTIVE SURFACES ON SOLIDS

This application is related to my copending application Ser. No. 256,323 filed May 24, 1972 (now U.S. Pat. No. 3,849,180).

FIELD OF THE INVENTION

The present invention relates to a method of forming surfaces of solid materials having a high effective surface area and, more particularly, to a method of producing solid materials having highly active surfaces for adsorption, catalysis or the like.

BACKGROUND OF THE INVENTION

In various chemical processes, technologies or related fields, it is necessary to provide a solid body or material with a high effective surface area or a highly active surace. For example, many chemical reactions are catalyzed or promoted by the presence of active sites on a solid substance, merely by reason of the existence of such sites or the presence thereat of catalytically effective substances. Similarly, adsorption in a function of the activity of the surface and, in general, it can be said that fluid interactions are promoted by surfaces having a high activity or by solid materials having an active surface.

Various treatments are known to provide the necessary highly active solid surface and, in general, it is recognized that high-surface activity is a function of a high ratio of effective surface area to volume or weight. A high ratio of effective surface area to weight or volume (high specific area) is generally associated with the fine subdivision of the material on the solid surface and thus many of the activating techniques are designed to deposit or form upon a support resistant to the medium to which it is subjected, a substance with a fine subdivision or in a highly subdivided state.

Thus solids having surfaces which are to be involved in a reaction, either as a reaction promoter or regulator or as a reaction participant, must generally be in a state of fine subdivision if homogeneity is to be insured and, in the case of reaction promoters, a high reaction rate is desired. To avoid the need to continuously mix a finely divided solid with the reactants and thereafter recover the solids from the reaction product (mixing and separation) at a high operating and equipment cost, it is known to precipitate the solids from solutions and to deposit them on supports having large surface areas or to form the solids into porous bodies. The loss in activity which thus results in rendering the active solids more compact is generally tolerable when the advantage of a distributed state of the solid is considered.

Widely differing requirements must be met by active solids as noted above, especially when they are provided in a compact state. They must, for example, be wear-resistant (i.e. resistant to abrasion by fluids and fluid-entrained solids with which they may come into contact), must have a high capacity which does not materially drop over long periods (high useful life), must have a degree of subdivision although compact which will sustain high reaction rates, and must be chemically resistant so that the compact does not deteriorate in the presence of the reaction system. Generally it is not possible to provide a solid system having a high surface area which meets all of these requirements since all or several of them are mutually exclusive.

To produce solid ion-exchange agents, for example, high-molecular-weight microporous bodies are made from low-molecular-weight substances by processes well known in the macromolecular chemical arts, i.e. by polymerization techniques. Any functional groups which may be contained in the starting substances or which may be provided by subsequent treatment deriving from only a limited number of possibilities, e.g. acidic, basic, redox-promoting (reduction-oxidation catalyst) and complexing groups. From this small variety of possible functional groups, it is not possible to provide the full spectrum of properties which may be necessary for a particular active solid. Materials which are deposited on activated carbon and on like porous supports, must adhere firmly and, frequently, a satisfactory bond cannot be obtained because of the nature of the support or the nature of the active materials to be applied thereto. In many cases, a firm bond degenerates with the change in pH or some other properties of the medium with which the solids are contacted. The active materials may thereby be lost in the reaction medium and the solid phase rendered useless.

OBJECTS OF THE INVENTION

It is the principal object of the present invention to provide an improved method of making a solid phase having high surface activity or active surface area, e.g. for the promotion of a reaction in a fluid, whereby the aforementioned disadvantages are obviated.

It is another object of the invention to provide a system having high surface activity for the purposes described.

SUMMARY OF THE INVENTION

The present invention is based upon my discovery that certain materials which have hitherto been used to limit surface activity can be used under specific conditions to provide highly effective surfaces for the promotion of chemical and physical reactions, e.g. catalytic or adsorptive activity. It has been known for considerable time that surfaces prone to attack can be preserved by applying to them film-forming materials which interpose a barrier between the substrate and an attacking environment such that further attack upon the substrate or initial attack is delayed or prevented. Now I have found that certain materials, long recognized for the purpose of protecting a substrate against surface attack and hence for limiting interaction at a surface between the fluid environment and a solid, may be used to provide surfaces of high activity to promote chemical reactions and the like.

More particularly, I have found that active solids having a wide spectrum of specific properties and, in many cases, improved properties with similar materials, can be obtained with high wear resistance, high reactive or adsorptive capacity, high physical or chemical stability, and high reaction rate by adding a mixture of binders to a solution or suspension of at least one activatable substance (i.e. a substance which is active or can be made active in the sense mentioned above) and coating the resulting composition onto a support, the coating being tough, firmly adherent and swellable. It has been found that such systems are effective as described and also for the bonding of peptizable reactants and that the binders should include at least one component which acts as a flocculating agent for at least one of the active or reactive substances.

I have found that the formation of active solid systems is particularly simple if the mixture of binders contains water-insoluble substances or substances which are only slightly swellable in water and which impart toughness, integrity and adhesive strength to the coating; the binders also include a component which is soluble and/or swellable in water and which, when combined with the water-insoluble components, is trapped in the coating so that it cannot be readily dissolved out and thereby render the coating swellable to such an extent that the coating is sufficiently permeable to allow access between the active substance and the reactant medium in contact with the coating.

It is particularly surprising that water-insoluble synthetic-resin materials, which are stable in alkaline and acid solutions and which are known as paint vehicles based on acrylic esters in latex or other dispersed form, may be used in spite of the fact that paints based on such systems have been used effectively to prevent interaction between a solid surface and a corrosive environment.

The binders may be acrylic esters in the form of homopolymers or in the form of copolymers with vinyl esters, stryrene, vinyl ethers, vinyl chloride and vinylidine chloride, by way of example. Suitable substances which are soluble or swellable and may be present in the binders as flocculating agents are the polyacrylates, polyacryla esters, acrylic-ester copolymers, polyacrylomides and polyethylene imines.

The mixture of binders may have a ratio of water-insoluble synthetic-resin substances and water-soluble or water-swellable synthetic-resin substances varying within wide limits and depending on the properties desired in the resulting coating. For example, where the coating is to have a high tenacity and wear resistance, the proportion of water-insoluble substances may be relatively high whereas, for a coating with a higher reaction rate or higher capacity, the proportion of water-soluble or water-swellable resins may be higher. Best results are obtained with 0.1 to 5% by weight, preferably 1% by weight, water-soluble synthetic-resin substances and 10 to 1000% by weight preferably 200% by weight, water-swellable synthetic-resin substances based upon the quantity of water-insoluble resins. This corresponds to a ratio of the water-insoluble synthetic resin to the flocculating agent of 20 to 1000:1 where the flocculating agent is water-soluble and a ratio of 10:1 to 1:10 where the flocculating agent is water swellable. A coating formed in these proportions has a high permeability and high wear resistance. It is of course desirable to use both water-soluble and water-swellable synthetic-resin materials in combination.

The activity of the coating may be increased by the addition of soluble or insoluble substances to the solution or suspension from which the coating is formed and which are removed or decomposed in situ, in whole or in part, when the coating has been formed on the support so that pores are left in the coating. These materials are generally referred to herein as "removable substances" and are present, in addition to the water-soluble or water-swellable synthetic resins mentioned previously.

The removable materials can include any substance which meets the above-mentioned solubility requirements, for example, simple organic compounds such as sugars and urea which do not dissolve in the coating composition but remain as small crystals so that upon solubilization, discrete pores are provided. Simple salts such as chlorides, sulfates, acetates and oxylates, generally of metals of the alkali and alkaline-earth group, substances which decompose by gas formation such as carbonates and hydrogen carbonates which can be activated by heating or by acid, colomites, chalk and sulfites may be employed. Mixtures of these poreforming substances may be used and the upper limit as to the proportion which can be employed, according to the present invention, is determined only by the mechanical destruction of the layer. In other words, any amount of these materials may be used as long as the integrity of the coating remains intact. Preferably 5% by weight of soluble or low-solubility substances and 50% by weight of insoluble substances may be used based on the total content of the dry binder.

It has been found that highly viscous solutions and/or suspensions of the binder, which have a filamentary or ropey characteristic when coated onto the substrate, are undesirable and it is thus important to maintain the viscosity such that a film forming coating of uniform and homogeneous distribution results. This control of the visocity may be obtained by adding monomeric or polymeric amines and amino alcohols, which not only act as viscosity modifiers but also as plasticizers, in amounts up to 1000% by weight based upon the total water-insoluble synthetic resin content.

The substrates which may be used may be any which are stable in the working medium and the surfaces may be smoothed, contoured or roughened. Surprisingly, smooth surface substrates are not disadvantageous because the porosity of the coating and the high surface activity thereof may replace the otherwise essential roughened surface. Substrates may be omitted entirely if only small amounts of a fluid are to be reacted, e.g. a small quantity of liquid, in which case the reacting fluid is simply contacted with droplets of the composition. For reactions with large quantities of liquid it is desirable to coat packing bodies or plates disposed in a stacked or closely-packed relation in the reaction cell or chamber. Alternatively, floating supports may be coated with the composition. Reaction cells containing floating bodies coated with the composition of the present invention have the advantage that they are of simple construction, enable relatively close packing of the coated bodies, offer little resistance to the downward flow of the reactant liquid and preclude detrimental action by entrained air. The cell liquids can be drained completely so that the quantities of liquid required for rinsing, if a change in liquids is desirable, is substantially reduced.

Best results have been obtained when the composition is coated onto foamed or foamable synthetic-resin material of the polystyrene or polyurethane type. The material may be foamed before it is coated with the composition or during its coating or admixture therewith, or subsequently during a drying step. If the material is preformed, part of the binder may be added in an amount such that it will not be seriously affected by the foaming so that the light weight mass is loosely bonded for convenient handling.

The sequence in which the components of the mixture are combined is of no significance to the result which is produced. However, it has been found to be advantageous to mix the liquids together and mix the solids together and thereafter form the coating composition by blending the solids, the mixed solids and liquids and mixing the substrate particles or bodies therewith. Of course, the substrate bodies can be mixed with either the liquid component or the solid component and thus can be present when the two components are combined.

SPECIFIC EXAMPLES

EXAMPLE 1

0.2 kilograms of a flocculating agent consisting of polyacrylamide are dissolved in 20 kilograms of a low-viscosity dispersion (25%) of an acrylate copolymer which is conventional as a paint vehicle. 20 kilograms diethanolamine are added to the viscous, film-forming solution to render it spreadable. This mixture and 40 kilograms of a high-viscosity dispersion of an acrylic ester copolymer conventional as a paint vehicle, 50 kilograms calcium stannate, 1 kilogram sodium hydrogen carbonate and 10 kilograms prefoamed Styropor P 455 (polystyrene) beads are intimately blended until a uniform sticky coating has been formed on each Styropor particle. The material is dried in loosened layers at temperatures up to about 100°C. The process can be considerably accelerated even at a low temperature by a circulation of air, the use of a vacuum, and tumbling. It will be highly desirable to tumble and at the same time to supply warm air through the tumbling mechanism.

Together with or without the supports on which the material is dried and which consists of paper, sheet metal, perforated sheet metal, or the like, the material is coarsely crushed and is activated by being reacted with hot hydrochloric acid of about 1% concentration. The disintegration into the individual particles will be accelerated by kneading, stirring or other mechanical agitation. Because the material is buoyant, it should be immersed into the hydrochloric acid by a perforated plate or the like. It will be desirable to perform the activation in a closed rotary drum, which is provided with suitable internal fixtures to break the flow.

The end of the reaction is indicated by a change in color from gray to yellow. When washed with water, the mass is ready for use and will resist even 60% sulfuric acid at 70°C.

EXAMPLE 2

The same mixture is prepared as in Example 1.

In this case, 0.2 kilograms flocculating agent consisting of polyacrylamide are added as an aqueous solution of 1% concentration. 2 kilograms polyethylene imine are added to thicken the mixture.

EXAMPLE 3

The same mixture is prepared as in Example 1.

In this case, 1 kilogram sodium hydrogen carbonate as a pore-forming agent is replaced by a mixture of 0.5 kilograms sodium hydrogen carbonate, 10 kilograms chalk and 2.5 kilograms common salt.

When it is desired to reduce the buoyancy of the coated particles in the working media, any desired insoluble substances, preferably barite or lead sulfate, may be admixed in the required amounts to the mixtures.

I claim:

1. A process for bonding a particulate active solid consisting of calcium stannate to pieces of polystyrene substrate, which comprises:

depositing said calcium stannate on the polystyrene from an aqueous medium containing essentially:

a. at least one water-insoluble synthetic resin selected from the group which consists of copolymers of acrylic esters with styrene, vinyl ethers, vinyl esters, vinyl chloride, and vinylidene chloride, and b. at least one further synthetic resin, water-soluble or water-swellable substance serving as a flocculating agent for said calcium stannate, said flocculating agent being a polyacrylamide or a polyethylene imine, the ratio of said synthetic resin (a) to said flocculating agent (b) is water-soluble or within the range 10:1 to 1:10 where said flocculating agent is water-swellable.

* * * * *

UNITED STATES PATENT AND TRADEMARK OFFICE
CERTIFICATE OF CORRECTION

PATENT NO. : 3,947,612
DATED : 30 March 1976
INVENTOR(S) : Reinhold SCHULZE

It is certified that error appears in the above—identified patent and that said Letters Patent are hereby corrected as shown below:

<u>CLAIM 1.</u> (column 6, paragraph b., line 38) after "is"

insert: -- selected within the range (20 to 1000):1 where said flocculating agent is -- .

Signed and Sealed this twenty-sixth Day of July 1977

[SEAL]

Attest:

RUTH C. MASON
*Attesting Officer*

C. MARSHALL DANN
*Commissioner of Patents and Trademarks*